United States Patent [19]

Spasojevic

[11] 4,250,959
[45] Feb. 17, 1981

[54] COOLING AND COOKING APPARATUS

[76] Inventor: Ratko Spasojevic, Sandbergerstrasse 36, D-7000 Stuttgart 1, Fed. Rep. of Germany

[21] Appl. No.: 25,759

[22] Filed: Apr. 2, 1979

[30] Foreign Application Priority Data

Nov. 30, 1978 [DE] Fed. Rep. of Germany ....... 2851918

[51] Int. Cl.³ .............................................. F25B 29/00
[52] U.S. Cl. ............................ 165/61; 165/DIG. 25; 126/379; 312/236; 99/483; 99/532
[58] Field of Search ......................... 99/483, 470, 532; 126/379; 312/236; 165/58, 61; 62/62

[56] References Cited

U.S. PATENT DOCUMENTS

| | | | |
|---|---|---|---|
| 2,617,349 | 11/1952 | Tucker | 99/483 |
| 2,620,789 | 12/1952 | Gregory | 126/379 |
| 2,787,891 | 4/1957 | Hengehold | 312/236 |
| 3,291,030 | 12/1966 | Arnold | 99/532 |

Primary Examiner—Albert W. Davis
Assistant Examiner—Margaret A. Focarino
Attorney, Agent, or Firm—McCormick, Paulding & Huber

[57] ABSTRACT

An upwardly open chest has a hinged lid, and oppositely movable roller blinds to close an upper compartment in which food can be cooked, or stored at normal refrigerator temperatures. A steam rod support structure slides parallel the lid's hinge line for selectively cooking food in this compartment, and front doors provide access to a frozen food storage compartment. Conventional steam cooking and refrigeration cycle components circulate cooling or heating fluid to coils or moist steam outlet pipes in certain compartments selectively.

4 Claims, 6 Drawing Figures

COOLING AND COOKING APPARATUS

BACKGROUND OF INVENTION

This invention relates to cooling and cooking devices, and deals more particularly with a device which is suitable for both freezing and cooking by means of superheated system.

It has been known for some time that potatoes can be pressure-cooked to the required soft consistency by means of a potato steamer (German Patent No. PS 85 468); the loading compartment of this steamer, into which the potatoes are placed, is fitted with a horizontal pipe with lateral branchings which are connected to downward directed steam-jet pipes. On the one hand, this conventional potato steamer is only suitable for pressure-cooking potatoes; on the other hand, it would be neither suitable nor convenient enough to be utilized in households, snack bars, fast-food establishments and the like.

Another conventional process is to keep food frozen in freezers or the like and then, prior to their consumption, to quick-heat them by admitting dry steam (German Patent No. PS 1 271 338). The conventional device used for this purpose is utilized primarily in restaurants for the quick-cooking of frozen vegetables and the like. This device is hardly suitable for use in households or snack bars or fast-food establishments preparing an array of different foods (soups, sauces, vegetables and generally any pre-cooked dishes), because it is too unwieldy and ill equipped for the simultaneous heating of several different food items. Furthermore, it is bothersome to have to get the food items from a frozen food chest or deep freeze room in each instance and carry them to the location where they are to be heated and then, later on, to take those items back to the freezer or deep-freeze room which, perhaps, were not heated because there was no call for them.

SUMMARY OF INVENTION

It is the purpose of this invention to provide a device for both cooling and cooking, which is considerably more convenient than the two devices described above, and which will save time and motion.

Using the device under this invention, food may be kept frozen and subsequently be heated, prepared and cooked by superheated steam, as needed, within a very short time.

It can be used to keep frozen and then to heat or cook, within the briefest of timespans, frozen prepared foods as well as raw potatoes, Spaetzle (homemade noodles), tea or coffee.

Operation of the device is extremely simple, because the food to be consumed is merely to be taken from the storage compartment and placed into the working compartment. The steam rod is positioned above the particular food item and its steam-jet pipes inserted into the food and left in place until the moist superheated steam emitting from the nozzles of the steam-jet pipes has heated or cooked the food sufficiently. The device provides primarily for use of moist steam, so that it can easily be used to cook raw potatoes or Spaetzle. The device is particularly well suited for frozen soups, sauces, vegetables, prepared dishes and the like, as well as for food items of all types which are to be taken from the storage compartment for quick-heating. The cooling and cooking device under this invention conforms ideally to standard measurements of built-in kitchens in order to be able to install them in any modern kitchen unit without difficulty. It is furthermore, suitable for snack bars, because food items may be kept frozen in its storage compartment for use on the following day, allowing considerable reduction in kitchen personnel because dishes may be cooked in advance for a considerable period of time. Frozen food storage will become much less expensive, because it takes place within the cooling and cooking device itself.

DETAILED DESCRIPTION

Figure 1:
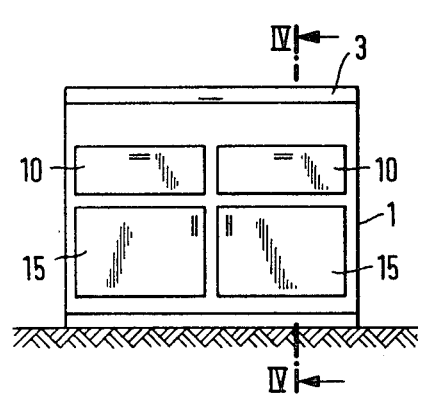
FIG. 1 is a front elevational view showing a cooling and cooking device according to this invention.
Figure 2:
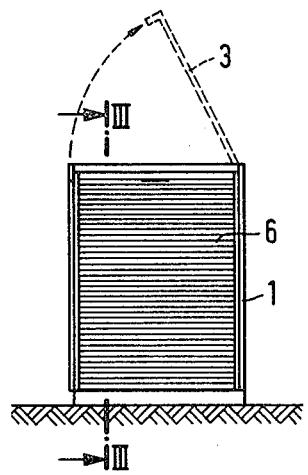
FIG. 2 is a side elevational view of the device shown in FIG. 1.
Figure 3:
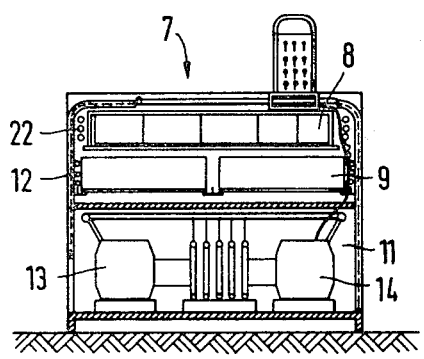
FIG. 3 is a sectional view taken along the line III—III of FIG. 2, in which the lid is omitted and the steam rod inclined slightly upward for facility of viewing.
Figure 4:
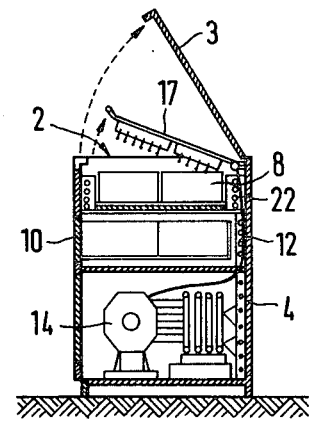
FIG. 4 is a sectional view taken along line IV—IV of FIG. 1, in which the lid and the steam rod are inclined partially upward.

The cooling and cooking device shown in the drawings comprises a generally rectangular chest (1) which is essentially constructed with a top opening (2) along its entire width and length, covered by a hinged lid (3) which is hinged to the rear face (4) of the casing (1) by means of hinges (5).

Alternately, the top opening (2) of the chest (1) can optionally be closed by means of a two-piece rolling blind (6), whose two halves are retractable along the narrow sides of the chest prism, thus revealing the opening (2). A working compartment (7) is accessible from above through the opening (2); food containers (8), containing food to be cooled or cooked, can be placed into this working compartment. Below the working compartment (7), there is a storage compartment (9) in which food containers (8) with food requiring deep-freeze can be placed; this compartment is accessible through two doors (10) at the front of the casing (1). Below the storage compartment (9), the device contains an engine compartment (11), containing a conventional refrigeration system connected to the cooling coils (12) in the area of the storage compartment, as well as a superheated steam system (14). The engine compartment (11) is accessible from the front of the casing (1) through doors (15).

Figure 6:
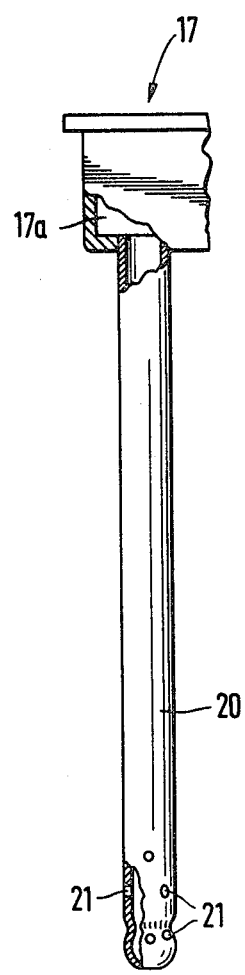
FIG. 6 is an enlarged view of one steam bar such as shown in FIGS. 4 and 5.

The upper portion of the rear face (4) of the chest, above the working compartment (7), is fitted with a horizontal guide bar (16). A steam rod support structure (17), which is further described below, moves horizontally on this guide bar and swivels vertically from there. The steam rod support structure (17) consists of two tandem-joined separate parts (17a and 17b). On its upper surface the steam rod support structure (17) is fitted with a handle (18) to facilitate the swiveling and sliding action of the steam rod structure. The steam rod structure parts (17a, 17b) are connected to the superheated steam system (14) in the engine compartment (11) by way of the steam feeder hoses, (19a, 19b). Each of the steam rod structure parts (17a, 17b) contains a chamber (18), (FIG. 6), which is connected at one end with a steam feeder hose (19a or 19b respectively), and at the other end with steam-jet pipes (20). Each of the steam-jet pipes (20) has several steam-jet nozzles (21) at its lower or outlet end.

The systems (13 and 14) in the engine compartment (11) are of conventional design, and they are not a part of the invention. The refrigeration system (13) is of the type used in any freezer appliance available to the public. Similarly, the cooling coils (12) installed in the area of the storage compartment (9) for the cooling of frozen foods in that storage compartment have been arranged in a conventional manner, as is usual in an commerical deep-freeze appliance. The same applies to the cold insulation of the storage compartment (9). Furthermore, the superheated steam system (14) may comprise any small steam generator, such as the type used in restaurants' coffee machines.

In the area of the working compartment (7) there are located some additional cooling coils (22), which are connected to the cooling system (13); this allows additional cooling of food within the food containers (8) located in the working compartment (7), if needed.

Figure 5:
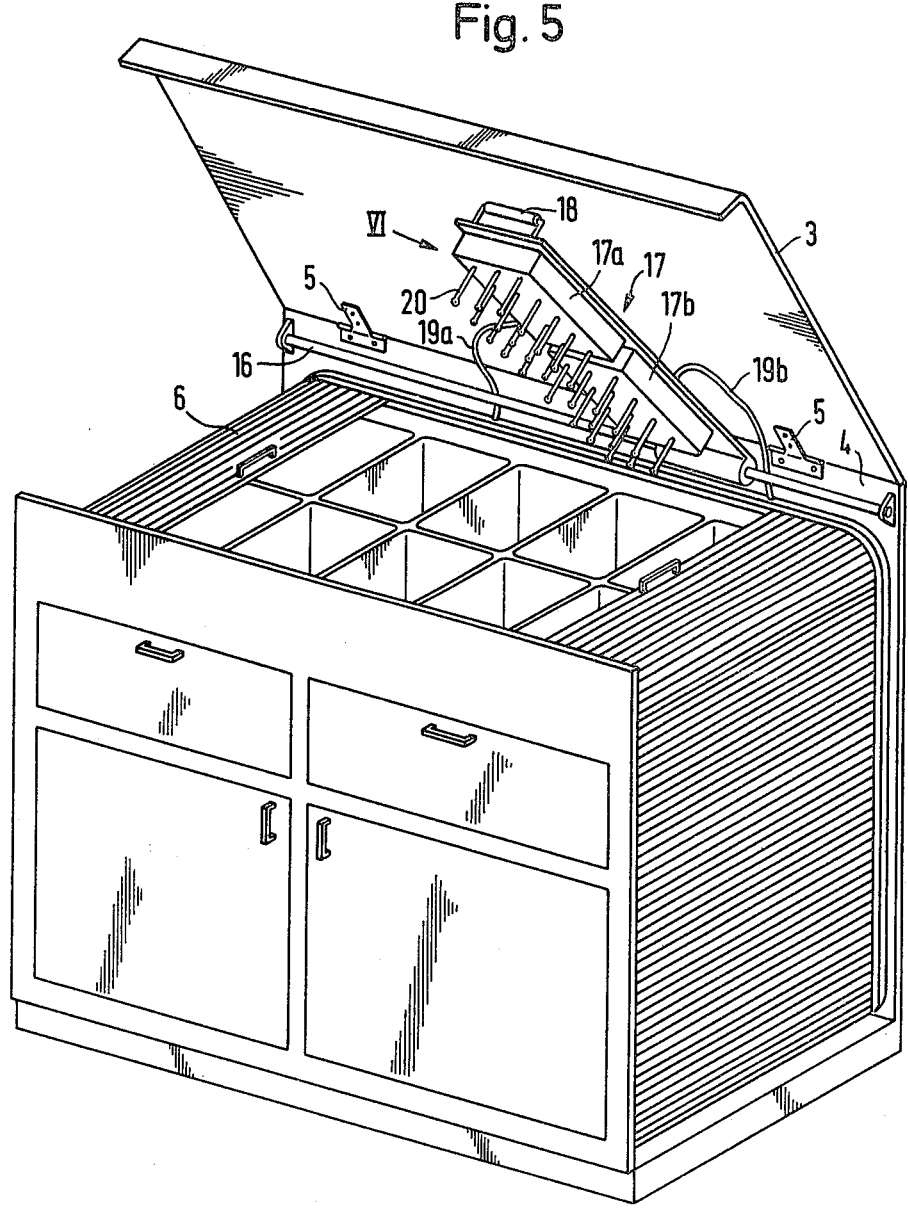
FIG. 5 is a perspective view of the FIG. 1 device.

Whenever there is no food to be heated in the cooling and cooking device, such as at nighttime, the rolling blinds (6) and lid (3) are closed, as shown in FIG. 1. In this case, only the cooling operation of the device is activated, keeping the food in the storage compartment (9) in its frozen state. In addition, any food contained in the working compartment (7) is refrigerated. When the device is to be used for the cooking of food, the hinged lid (3) is opened, the steam rod (17) is swivelled upward, the rolling blind (6) is opened, and the food to be cooked—unless already located in the working compartment (7)—is removed from the storage compartment (9), briefly opening its doors (10) for the purpose, and then placed into the working compartment (7). This compartment is preferably defined by two discrete rows (as shown in FIG. 5) of individual receptacles or trays.

In this phase of the operation, if the working compartment was being cooled, the cooling coils (22) within the area of the working compartment (7) are shut off from the refrigeration cycle. The steam rod (17) is positioned above those food containers (8) which contain the food to be cooked, and the rod is swivelled downward until the steam-jet pipes (20) penetrate the food, or foods. Steam is then admitted through one or both of the steam feeder hoses (19a, 19b), so that superheated steam is emitted from nozzles (21), quickly heating the food or foods. When there are no food items left for cooking or finishing, the rolling blind (6) is closed, the steam rod (17) brought into a horizontal position, and the hinged lid (3) closed. The food containers (8) which were in the working compartment (7) but contain unheated food items, are now to be re-placed in the storage compartment (9), which has been operating as a freezer compartment all the while. Optionally, the food may be left in the trays of the working compartment (7) and be refrigerated there, perhaps at a temperature corresponding to that used in any household refrigerator, that is, well above the temperature in compartment (9).

The chest and the rolling blind (6) should preferably be made of metal. The exterior dimensions of the casing (1) are in conformance with standard dimensions for built-in kitchens. The device contains all of the parts required for its operation and requires only to be connected with the nearest waterpipe through an appropriate water connection, and with the existing circuit through an appropriate cable.

I claim:

1. A cooling and cooking device, comprising
   a chest (1), having an opening at the top to be covered, and a roller blind (6) and a hinged lid (3) for selectively covering said opening;
   a working compartment, accessible from above (7), for the accommodation of containers (8) for the food to be cooked;
   a horizontal guide bar (16), attached to an upper rear part of the casing above the working compartment;
   a steam rod support structure (17) with several steam-jet pipes, and means for sliding said steam-jet pipe support structure horizontally on the guide bar and for pivoting said structure vertically, a chamber (17a) connected to a source of superheated steam (14), said chamber being connected to one end of the steam-jet pipes, and steam nozzles (21) at the outlet ends of said steam-jet pipes;
   a storage compartment (9) for food to be frozen located below the working compartment (7) and accessible through at least one door at the front of the chest, and an engine compartment (11), located below the storage compartment and adapted to house a cooling system, and cooling coils (12) in the area of the storage compartment for connection with the cooling system.

2. The device according to claim 1, characterized by the fact that additional cooling coils (22) are connected to the cooling system installed within the area of the working comparment (7) for refrigeration of foods placed into the working compartment.

3. The device according to claims 1 or 2, characterized by the fact that the steam rod support system (17) comprises two separate parts (17a, 17b), each of which is connected to a steam feeder hoses (19a, 19b) and thus to the source of superheated steam.

4. The device according to claim 3, characterized by the fact that the roller blind (6) is constructed in two parts, retractable along the opposite sides of the chest, said chest having a generally rectangular prism shape.

* * * * *